United States Patent [19]

Monma et al.

[11] Patent Number: 4,928,277

[45] Date of Patent: May 22, 1990

[54] METHOD AND APPARATUS FOR DRIVING LASER BEAM SOURCE TO AVOID DROOP EFFECTS

[75] Inventors: Hisayoshi Monma; Atsushi Suganuma, both of Kanagawa, Japan

[73] Assignee: Fuji Photo Film Co., Ltd., Kanagawa, Japan

[21] Appl. No.: 206,398

[22] Filed: Jun. 14, 1988

[30] Foreign Application Priority Data

Jun. 18, 1987 [JP] Japan ................................ 62-151759

[51] Int. Cl.$^5$ ............................................. G11B 7/00
[52] U.S. Cl. .................................... 369/116; 346/108; 346/76 L
[58] Field of Search .............. 346/108, 76 L; 358/342; 369/100, 107, 116–121

[56] References Cited

U.S. PATENT DOCUMENTS

4,328,506  5/1982  Yoshida .......................... 369/116 X

Primary Examiner—Robert L. Richardson
Attorney, Agent, or Firm—Sughrue, Mion, Zinn, Macpeak & Seas

[57] ABSTRACT

A laser beam source is driven to emit a laser beam for use in scanning an image recording medium in order to record image information thereon in a plurality of exposure areas. The areas are spaced at intervals in a scanning direction in which the image recording medium is scanned by the laser beam. A first current supply source is responsive to an exposure signal for supplying the laser beam source with an exposure current of a higher in level than a threshold level of the laser beam source. A second current supply source supplies a bias current to the laser beam source when the scanning position of the laser beam source is a linear distance ahead of an exposure start position for each area to be exposed, the first and second current supply sources being connected parallel to each other.

8 Claims, 8 Drawing Sheets

METHOD AND APPARATUS FOR DRIVING LASER BEAM SOURCE TO AVOID DROOP EFFECTS

BACKGROUND OF THE INVENTION

The present invention relates to a method of and an apparatus for driving a laser beam source to apply a laser beam to an image recording medium, such as a photographic film for recording an image thereon. More particularly, the present invention relates to a method of and an apparatus for driving a laser beam source to energize/de-energize laser oscillation for exposing a subject or original while supplying a bias current of a level lower than a threshold level of the laser beam source to the laser beam source in order to eliminate image density irregularities which would otherwise be caused by a droop of the laser beam source. In the present invention, the bias current is supplied to the laser beam source at a position in front of a leading edge of the subject for preventing a recorded or reproduced image of the original from being fogged in its entirety or losing edge sharpness, so that high-quality images can be recorded or reproduced.

In printing and platemaking industries, image scanning recording/reproducing systems are widely used for electrically processing image information of subjects or originals to produce film plates in order to simplify the operation process and increase the image quality.

Such an image scanning recording/reproducing system basically comprises an image reading device and an image recording device. In the image reading device, image information on a subject which is fed in an auxiliary scanning direction is scanned in a main scanning direction by a photoelectric transducer which converts the image information to an electric signal. Then, the image information which has been photoelectrically converted by the image reading device undergoes various processes such as for gradation correction, profile emphasis, and the like dependent on the platemaking conditions in the image recording device. Thereafter, the image information thus processed is converted to a light signal represented by a laser beam, which is applied to an image recording medium made of a photosensitive material such as a photographic film to record the image information thereon. The image recorded on the image recording medium is then developed by an image developing device, and the developed image recording medium is used as a film plate for printing operation.

Laser diodes are widely used as the laser beam source for exposing the image recording medium with the laser beam since the laser diodes are small in size, low in cost, and highly reliable in operation.

Figure 1A:
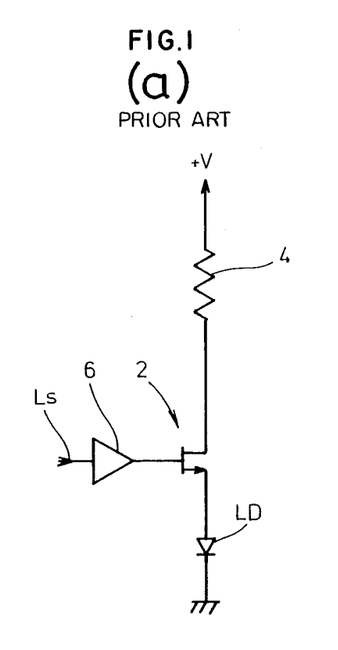
FIG. 1(a) is a conventional driver circuit for a laser diode.

FIG. 1(a) of the accompanying drawings shows a conventional driver circuit for a laser beam by way of example. A laser diode LD is connected between the source terminal of an FET 2 and ground, and a resistor 4 is connected between the drain terminal of the FET 2 and a power supply +V. The gate terminal of the FET 2 is supplied with a pulse signal Ls of a rectangular wave (see also FIG. 1(b)) through a buffer 6 for driving the laser diode LD. The laser diode LD is energized only for those periods in which the pulse signal Ls is positive. The timing of light emission from the laser diode LD is therefore accurately controlled by the pulse signal Ls for exposure of a photographic film or the like.

Figure 1B:
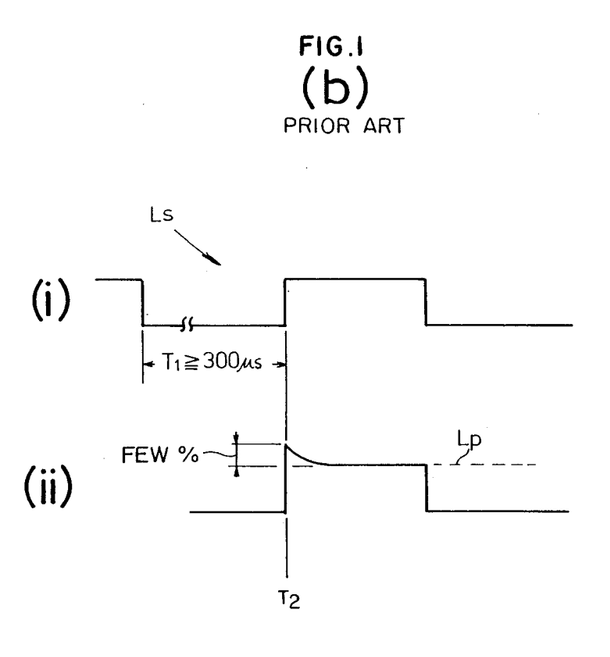
FIG. 1(b) is a diagram explaining the phenomenon of a droop of the laser diode shown in FIG. 1(a)

When the laser diode LD is energized at $T_2$ (FIG. 1(b)) by the pulse signal Ls after a pulse-free interval of about 300 $\mu$s indicated at (i) in FIG. 1(b), the amount of light emitted from the laser diode LD immediately after the laser diode LD is energized becomes a few % greater than a desired target amount of light LP. This phenomenon is generally called a "droop". It is known that the droop is caused by temperature-dependent characteristics of light emission efficiency of the laser diode LD. A photographic film which is exposed to a laser beam with a droop has a higher image density when exposure is commenced, with the result that the reproduced image suffers density irregularities.

Figure 2:
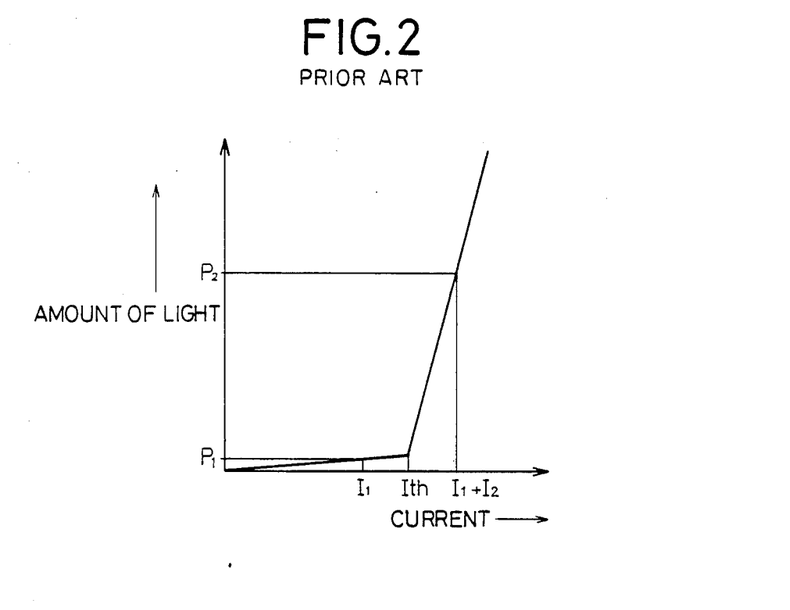
FIG. 2 is a diagram of a current vs. light amount curve of the laser diode.

An attempt has been made to solve the above problem by supplying the laser beam source at all times with a bias current $I_1$ (which causes the laser beam source to emit an amount of light $P_1$) which is lower than a threshold current Ith (which enables the laser beam source to emit a threshold amount of light) as shown in FIG. 2, for thereby reducing a change in the temperature of the laser diode LD at the time of emitting the laser beam. This method can be effected by inserting a bias resistor (not shown) between the anode of the laser diode LD and the power supply +V shown in FIG. 1(a).

Figure 3A:
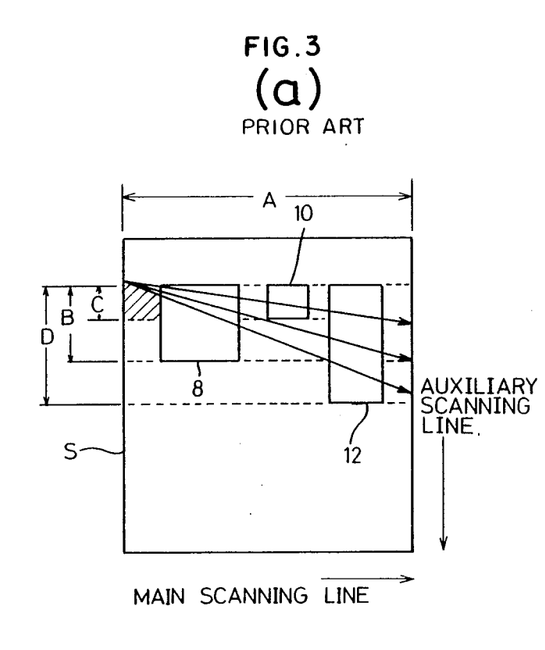
FIG. 3(a) is a diagram illustrating areas exposed to a laser beam by a conventional method of driving a laser beam source.
Figure 3B:
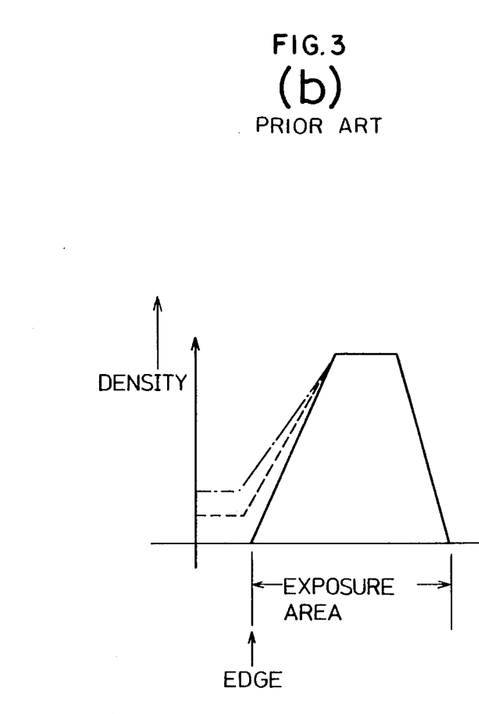
FIG. 3(b) is a diagram explanatory of a blurred edge of an image which is exposed by an apparatus which carries out the conventional method of driving a laser beam source.

However, the above method of reducing temperature changes has the following disadvantages: As shown in FIG. 3(a), when a single photographic film S is exposed to three subjects or original images 8, 10, 12, exposure to the image 8 is effected by scanning an area A x B on the film S with a laser beam having an amount of light $P_2$, exposure to the image 10 is effected by scanning an area A x C on the film S with a laser beam having the same amount of light, and exposure to the image 12 is effected by scanning an area A x D on the film S with a laser beam having the same amount of light. Therefore, a hatched area on the film S is exposed to the laser beam three times with the bias current $I_1$ (i.e., the amount of light $P_1$). The exposure ratio of the hatched area is $3 \times P_1/P_2$ which is of a value of 3% or greater. Consequently, the hatched area on the film S, which should not be exposed to the laser beam, is exposed many times with the low-level laser beam $P_1$ emitted by the bias current $I_1$. As a result, the scanning region including the reproduced images may be fogged or the front edge of the reproduced image corresponding to the subject image 8 may be blurred due to the lack of desired sharpness, as shown in FIG. 3(b).

SUMMARY OF THE INVENTION

It is a general object of the present invention to provide a method of and an apparatus for driving a laser beam source to energize/de-energize laser oscillation for exposing a subject or original while supplying a bias current of a level lower than a threshold level of the laser beam source to a laser diode, by starting to supply the bias current to the laser diode at a position in front of a leading edge of the subject and behind a trailing edge of a preceding subject for thereby preventing a reproduced image of the subject from being fogged in its entirety or losing image edge sharpness. An additional object of the present invention is for reproducing a high-quality image that is substantially free from image irregularities which would otherwise be caused by droop.

Another object of the present invention is to provide a method of driving a laser beam source to emit a laser beam to scan an image recording medium therewith for recording image information thereon in a plurality of exposure areas spaced in a scanning direction in which the image recording medium is scanned by the laser beam. The method comprises the step of starting to supply a bias current to the laser beam source at a position in front of a leading edge of each of the exposure areas in the scanning direction.

Still another object of the present invention is to provide a method of driving a laser beam source, wherein the bias current starts to be supplied to the laser beam source in a range extending from a position in front of a leading edge of a next exposure area which precedes one exposure area, to a position in front of a leading edge of the one exposure area.

Yet another object of the present invention is to provide a method of driving a laser beam source, wherein the bias current starts to be supplied to the laser beam source in a range extending from a position behind a trailing edge of a next, but single, exposure area which precedes one exposure area, to a position in front of a leading edge of the one exposure area.

Yet still another object of the present invention is to provide a method of driving a laser beam source, wherein the bias current starts to be supplied to the laser beam source in a range extending from a position behind a trailing edge of a next exposure area which precedes one exposure area, to a position in front of a leading edge of the one exposure area.

It is also an object of the present invention to provide an apparatus for driving a laser beam source to emit a laser beam to scan an image recording medium therewith for recording image information thereon in a plurality of exposure areas spaced in a scanning direction in which the image recording medium is scanned by the laser beam, the apparatus comprising a first current supply source responsive to an exposure signal for supplying the laser beam source with an exposure current higher in level than a threshold level of the laser beam source, and a second current supply source for starting to supply a bias current to the laser beam source at a position in front of a leading edge of each of the exposure areas in the scanning direction, the first and second current supply sources being connected in parallel to each other.

A further object of the present invention is to provide an apparatus for driving a laser beam source, wherein the second current supply source starts to supply the bias current to the laser beam source in a range extending from a position in front of a leading edge of a next exposure area which precedes one exposure area, to a position in front of a leading edge of the one exposure area.

A still further object of the present invention is to provide an apparatus for driving a laser beam source, wherein the second current supply source starts supplying the bias current to the laser beam source in a range extending from a position behind a trailing edge of a next, but single, exposure area which precedes one exposure area, to a position in front of a leading edge of the one exposure area.

A yet further object of the present invention is to provide an apparatus for driving a laser beam source, wherein the second current supply source starts supplying the bias current to the laser beam source in a range extending from a position behind a trailing edge of a next exposure area which precedes one exposure area to a position in front of a leading edge of the one exposure area.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 4:
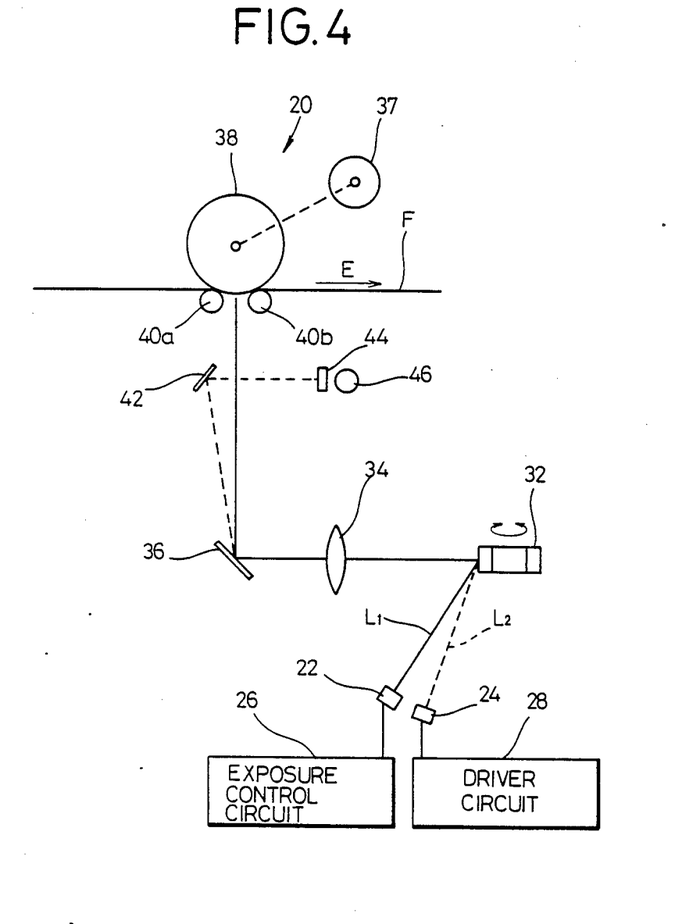
FIG. 4 is a diagram of a laser beam source apparatus for carrying out a method of driving a laser beam source according to the present invention.

As shown in FIG. 4, a laser beam source apparatus for carrying out a method of driving a laser beam source according to an embodiment of the present invention has a laser beam source assembly 20 including an exposure laser diode 22 for emitting an exposure laser beam $L_1$, and a grating laser diode 24 for emitting a grating laser beam $L_1$. The exposure laser diode 22 is controlled by an exposure control circuit 26 which will be described later in detail. The grating laser diode 24 is energized by a driver circuit 28.

The exposure laser beam $L_1$ emitted from the exposure laser diode 22 is converted by a collimator (not shown) to a parallel-ray laser beam, which is then deflected by a polygon mirror 32 rotating in the direction of the arrow, an fθ lens 34, and a mirror 36 to scan the circumferential surface of a transfer drum 38 in a main scanning direction normal to the sheet of FIG. 4 while the transfer drum 38 is being rotated by an auxiliary scanning feed motor 37. A photosensitive film F is pressed against the transfer drum 38 by means of a pair of nip rollers 40a, 40b while being fed in an auxiliary direction indicated by the arrow E by the transfer drum 38.

The grating laser beam $L_2$ emitted from the grating laser diode 24 is converted by a collimator (not shown) to a parallel-ray laser beam, which is then deflected by the polygon mirror 32, the $f\theta$ lens 34, the mirror 36, and a mirror 42 to illuminate a grating slit member 44 which longitudinally extends in a direction normal to the sheet of FIG. 4. The grating slit member 44 has alternate light transmitting lines (slits) and light reflecting lines spaced in the main scanning direction. A grating sensor 46 comprising a light guide rod (not shown) and a light detector is disposed behind the grating slit member 44 for detecting the grating laser beam that has passed through the grating slit member 44. An output signal from the grating sensor 46 is supplied to the exposure control circuit 26.

Figure 5:
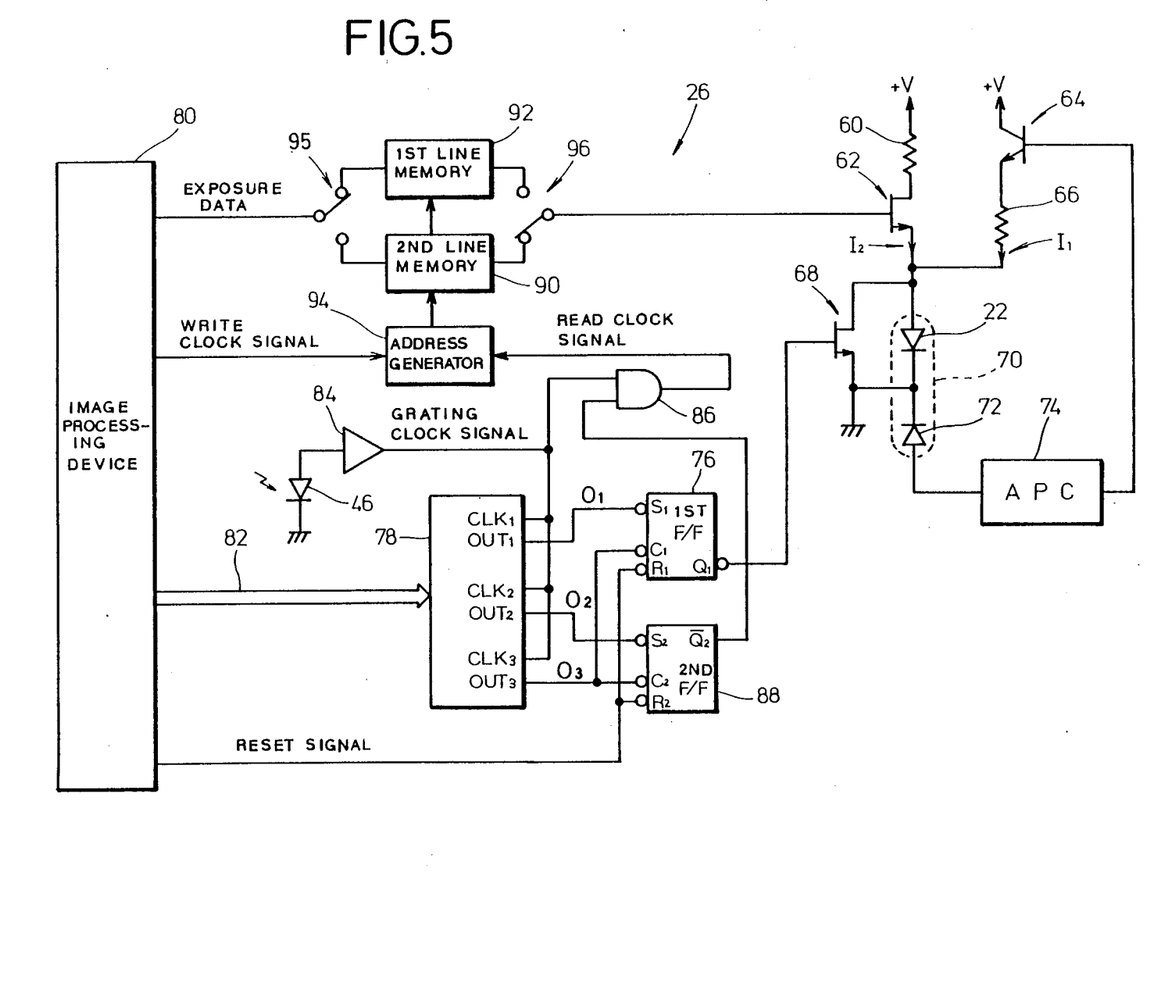
FIG. 5 is a block diagram of an electric circuit including an exposure control unit in the laser beam source apparatus.

The exposure control circuit 26 for controlling the exposure laser diode 22 is arranged as shown in FIG. 5. The exposure laser diode 22 is supplied with an exposure current $I_2$ from a power supply $+V$ through a resistor 60 and an exposure FET 62, and also with a bias current $I_1$ from the power supply $+V$ through a bias current controlling transistor 64 and a bias current setting resistor 66. An FET 68 is connected across the exposure diode 22 for turning on or off the bias current $I_1$. The laser diode 22 is housed in a package 70 in which there is also housed a PIN photodiode 72 for detecting a light signal emitted from the laser diode 22. The PIN photodiode 72 applies an output signal as a feedback signal to the base of the bias current controlling transistor 64 through an automatic power control circuit (APC circuit) 74 which automatically controls the amount of light emitted from the exposure laser diode 22 at a constant level.

The FET 68 has a gate terminal connected to an output terminal $Q_1$ of a first synchronous flip-flop IC (F/FIC) 76 which has a set input terminal $S_1$, a clock input terminal $C_1$, and a reset input terminal $R_1$ which are supplied respectively with output signals from a channel-1 output terminal $OUT_1$ and a channel-3 output terminal $OUT_3$ of a programmable counter 78 and a reset signal from an image processing device 80. The programmable counter 78 is connected to the image processing device 80 by a data line 82 for determining an exposure area of a subject or original and a range in which the bias current $I_1$ is to be applied. The programmable counter 78 has channel-1 through channel-3 clock input terminals $CLK_1$ through $CLK_3$ coupled to each other and supplied with a grating clock signal from an amplifier 84 which amplifies the output signal from the grating sensor 46. The grating clock signal is also applied to one input terminal of an AND gate 86 which generates a read clock signal. The other input terminal of the AND gate 86 is supplied with a signal from an output terminal $Q_2$ of a second synchronous F/FIC 88. The second F/FIC 88 has a set input terminal $S_2$ and a clock input terminal $C_2$ which are connected respectively to a channel-2 output terminal $OUT_2$ and the channel-3 output terminal $OUT_3$ of the programmable counter 78. The second F/FIC 88 has a reset terminal $R_2$ to which the reset signal from the image processing device 80 is applied.

The read clock signal from the AND gate 86 is applied to an address generator 94 which determines read-out addresses of first and second line memories 92, 90. The address generator 94 determines write-in addresses in response to a write clock signal from the image processing device 80. The first and second line memories 92, 90 write exposure data at the determined write-in addresses. The first and second line memories 92, 90 have opposite terminals connected to multiplexers 95, 96. The multiplexer 95 has a common terminal supplied with the exposure data, whereas the multiplexer 96 has a common terminal coupled to the gate terminal of the exposure FET 62. The multiplexers 95, 96 are ganged to each other such that they will be connected exclusively to the first and second line memories 92, 90. That is, when the multiplexer 95 is connected to the first line memory 92, the multiplexer 96 is connected to the second line memory 90, and vice versa.

The laser beam source apparatus for carrying out a method of the present invention is constructed as described above. Operation and advantages of the laser beam source apparatus will now be described below.

Figure 6:
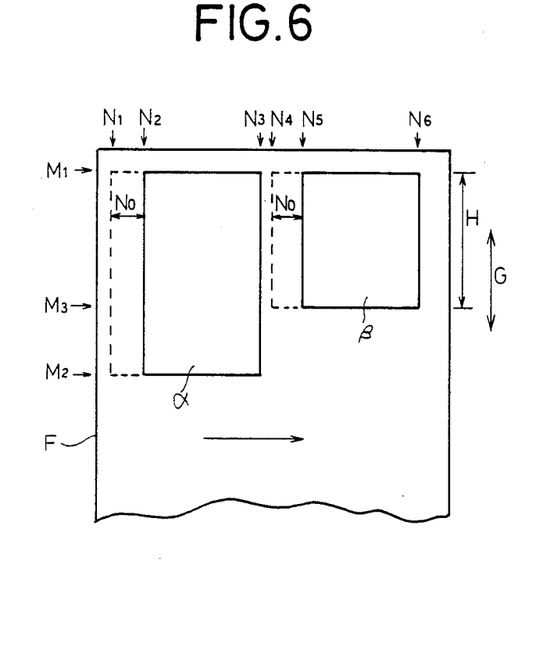
FIG. 6 is a diagram explaining areas exposed on a photographic film by the laser beam source apparatus.

Now, it is assumed that a photographic film F is to be exposed to a subject image in an exposure area $\alpha$ and a subject image in an exposure area $\beta$, as shown in FIG. 6. The exposure areas $\alpha$, $\beta$ may possibly have a common area in an interval H in the auxiliary scanning direction indicated by the arrow G.

Exposure control for exposing the film F in the exposure area will first be described. Data on the exposure area $\alpha$ is read into the image processing device 80 (FIG. 5), using a digitizer, as to an exposure starting position $N_2$ in the main scanning direction, an exposure ending position $N_3$ in the main scanning direction, an exposure starting position $M_1$ in the auxiliary scanning direction, and an exposure length ($M_2 - M_1$). The image processing device 80 subtracts a certain interval $N_0$ for the supply of the bias current $I_1$ from the exposure starting position in the main scanning direction to determine a bias exposure starting position $N_1$. This data relative to the exposure area $\alpha$ is then transferred via the data line 82 to the programmable counter 78 in the exposure control circuit 26. The exposure starting position $N_2$ in the main scanning direction is set in channel 2 of the programmable counter 78, the exposure ending position $N_3$ in the main scanning direction is set in channel 3 of the programmable counter 78, and the bias exposure starting position $N_1$ is set in channel 1 of the programmable counter 78.

Figure 7:
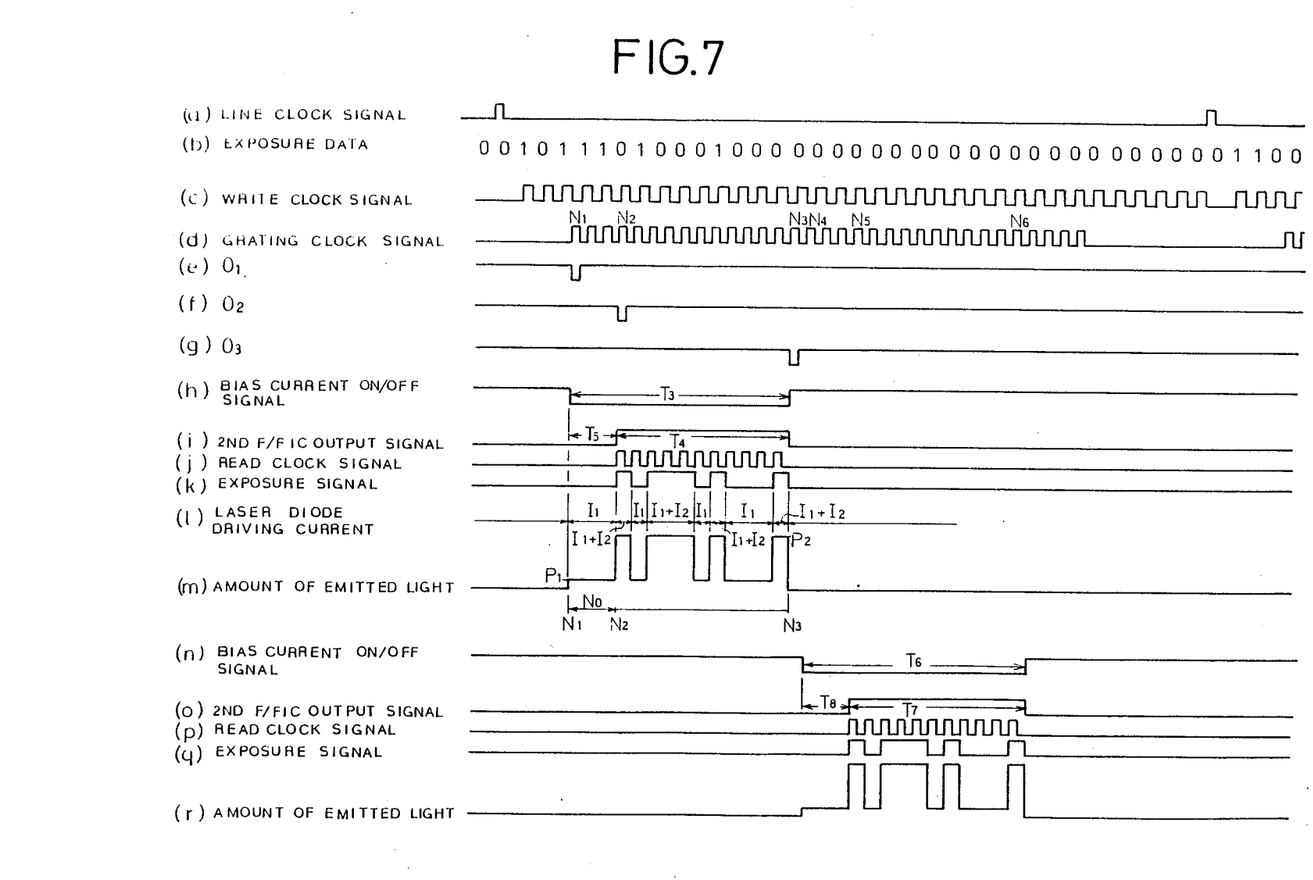
FIG. 7, consisting of (a)-(r), is a timing chart of the operation of the exposure control unit in the laser beam source apparatus.

After the data has thus been set, a signal representative of the exposure starting position $M_1$ in the auxiliary scanning direction is issued from the image processing circuit 80 to energize the auxiliary scanning feed motor 37 to rotate the transfer drum 28, thereby setting the film F to the exposure starting position $M_1$ in the auxiliary scanning direction. When a line clock signal (see FIG. 7(a)) in the exposure control circuit 26 is sent to the image processing device 80, the image processing device 80 loads exposure data (see FIG. 7(b)), which has been read from the subject and digitized, into the first line memory 92 at a write-in address generated by the address generator 94 each time a write clock pulse of the write clock signal (see FIG. 7(c)) is applied. When one-line data for a one scanning interval has been loaded into the first line memory 92, the multiplexer 95 is switched over to load next-line data into the second line memory 90. The exposure data loaded in the first line memory 92 is read by respective read clock pulses of the read clock signal (see FIG. 7(j)), and is supplied as an exposure signal to the gate terminal of the exposure FET 62.

A process of exposing the film F is as follows: The grating laser beam $L_2$ from the grating laser diode 24 is reflected by the polygon mirror 32, and applied via the $f\theta$ lens 34 and the mirrors 36, 42 to the grating slit member 44. The laser beam then passes through the slits of the grating slit member 44, and is guided by the light guide rod (not shown) to the grating sensor 46, which photoelectrically converts the laser beam to a grating clock signal. This grating clock signal is then amplified by the amplifier 84 and applied to the clock input terminals $CLK_1$ through $CLK_3$ of the programmable counter 78 and one of the input terminals of the AND gate 86. When the numbers of grating clock pulses corresponding to the bias exposure starting position $N_1$, the exposure starting position $N_2$, and the exposure ending position $N_3$ (see FIG. 6) which are set in the programmable counter 78 for the exposure area $\alpha$ have been applied to the clock input terminals $CLK_1$ through $CLK_3$ of the programmable counter 78, corresponding output signals $O_1$, $O_2$, $O_3$, (see FIG. 7(e) through (g)) are issued respectively from the output terminals $OUT_1$, $OUT_2$, $OUT_3$ of the programmable counter 78. The output signal $O_1$ (FIG. 7(e)) turns on a bias current on/off signal (FIG. 7(h)) to make the gate terminal of the FET 68 a level, thus rendering the FET 68 nonconductive and allowing the bias current $I_1$ to flow into the laser diode 22. The output signals $O_2$, $O_3$ (FIG. 7(f) and (g)) determine the exposure starting and ending positions $N_2$, $N_3$ of the exposure area $\alpha$, whereupon a read clock signal (FIG. 7(j)) is generated during the interval in which the output signal (FIG. 7(i)) from the second F/FIC 88 is high. The read clock signal is applied to the address generator 94 to read the exposure data loaded in the first line memory 92 for the exposure area $\alpha$ and to supply the read exposure data as an exposure signal (see FIG. 7(ki)) to the gate terminal of the exposure FET 62. Intervals $T_3$, $T_4$ indicated in FIG. 7(h) and (i) are respectively a bias interval in which the bias current is supplied and an exposure interval in which the exposure signal is applied to the exposure FET 62. During intervals in which the exposure signal is high as indicated in FIG. 7(k), the sum of the exposure current $I_2$ and the bias current $I_1$ is supplied to the laser diode 22. During intervals in which the exposure signal is low, only the bias current $I_1$ is supplied to the laser diode 22. Only the bias current $I_1$ is supplied to the laser diode 22 during an interval $T_5$ indicated in FIG. 7(i). Therefore, the amount of light emitted from the laser diode 22 is controlled as shown in FIG. 7(m).

In the interval $N_0$ shown in FIG. 6, only the bias current $I_1$ is supplied to the laser diode 22 to preheat the same. The film F is then actually exposed in the exposure interval ($N_3$- $N_2$) extending in the main scanning direction. Since the exposure interval in the exposure area $\alpha$ is exposed after the laser diode 22 has been preheated, the droop of the laser diode 22 is greatly reduced.

Exposure control for the exposure area $\beta$ is as follows: This exposure control can easily be understood by referring to the exposure operation for the exposure area $\alpha$. First, the first F/FIC 76 and the second F/FIC 88 are reset by the reset signal from the image processing circuit 80. Then, a coefficient relative to an exposure starting position $N_5$ (FIG. 6) in the main scanning direction is set in channel 1 of the programmable counter 78, an exposure ending position $N_6$ in the main scanning direction is set in channel 2 of the programmable counter 78, and a bias exposure starting position $N_4$ is set in channel 1 of the programmable counter 78. The film F is then exposed in the exposure area $\beta$ in the same manner as it was exposed in the exposure area $\alpha$. Intervals $T_6$, $T_7$, $T_8$ indicated in FIG. 7(n) and (o) correspond functionally to the bias current supplying interval $T_3$, the exposure interval $T_4$, and the preliminary bias current supplying interval $T_5$. FIG. 7(p) and (q) represent a read clock signal and an exposure signal, respectively. The amount of light emitted from the laser diode 22 is controlled as indicated in FIG. 7(r).

As can be seen from FIG. 6, the film F is exposed to light emitted by the bias current $I_1$ only in the intervals $N_0$ and only once. The extent to which the film F including the exposure areas is fogged by the light emitted by the bias current is merely about 1%. Therefore, any reduction in the sharpness of the edges of the exposure areas $\alpha$, $\beta$ is also very small.

Figure 8:
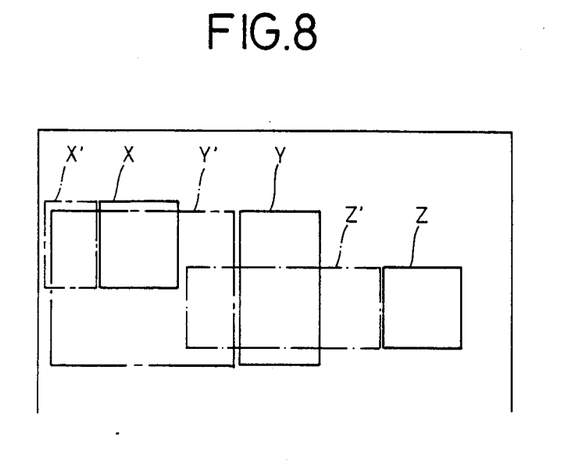
FIG. 8 is a diagram explaining a method of driving a laser beam source according to another embodiment of the present invention.

FIG. 8 is illustrative of a method of driving a laser beam source according to another embodiment of the present invention. According to this method, the position at which a bias current is supplied is controlled according to how many times a film may be exposed to light emitted by a fog-producing bias current (in areas represented by the dot-and-dash lines). In the illustrated embodiment, the film is allowed to be exposed twice to the light emitted by the bias current. In FIG. 8, the film is exposed to images in areas X, Y, Z enclosed by the solid lines, and exposed to the light emitted by the bias current in areas X', Y', Z' enclosed by the dot-and-dash lines.

Figure 9:
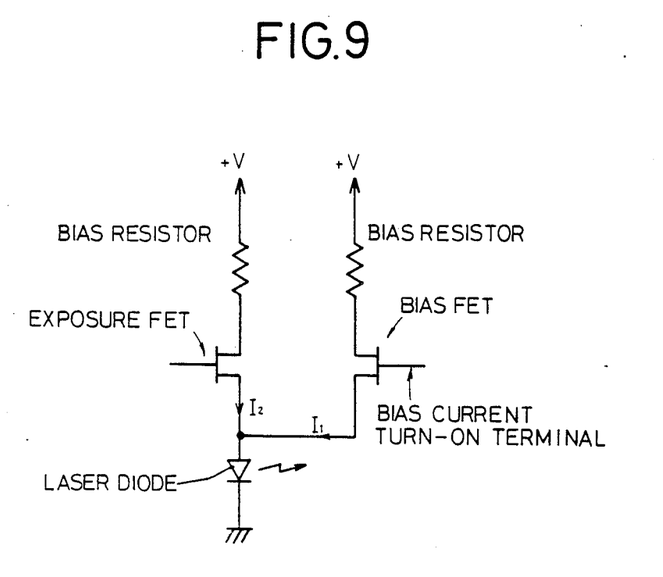
FIG. 9 is a circuit diagram of an exposure control unit according to still another embodiment of the present invention.

According to still another embodiment of the present invention shown in FIG. 9, a bias current $I_1$ is supplied from an FET.

With the arrangement of the present invention, as described above, a low-level bias current lower than the threshold of a laser diode starts being supplied to the laser diode at a position in front of a leading edge of an exposure area of a film in a main scanning direction. Therefore, any fogging of the film is highly reduced, or the edges of a reproduced image are prevented from being blurred or are defined as sharp edges. Images of high quality free of image density irregularities due to droop can thus be reproduced.

Although certain preferred embodiments have been shown and described, it should be understood that many changes and modifications may be made therein without departing from the scope of the appended claims.

What is claimed is:

1. A method of driving a laser beam source to emit a laser beam for use in scanning an image recording medium in order to record image formation on said image recording medium in a plurality of exposure areas, said exposure areas being spaced at intervals in a scanning direction in which said image recording medium is scanned by said laser beam, said method comprising the step of:
   supplying a bias current to a laser beam source when a scanning position of said laser beam source is a predetermined distance ahead of an exposure starting position for at least one area to be exposed.

2. A method according to claim 1, wherein said bias current is supplied to said laser beam source while said scanning position of said laser beam source travels between a position which is a predetermined distance ahead of a first exposure area and a trailing edge of a second exposure area.

3. A method according to claim 2 wherein said bias current is supplied to said laser beam source while said scanning position of said laser beam source travels between a predetermined distance ahead of said second exposure area and a trailing edge of a next single exposure area.

4. A method according to claim 1, wherein said bias current is supplied to said laser beam source while said scanning position of said laser beam source travels between a first predetermined distance ahead of a subsequent exposure area and a trailing edge of said subsequent exposure area.

5. An apparatus for driving a laser beam source to emit a laser beam for use in scanning an image recording medium in order to record image information on said image recording medium in a plurality of exposure areas, said exposure areas being spaced in a scanning direction in which said image recording medium is scanned by said laser beam, said apparatus comprising:
   a first current supply source responsive to an exposure signal for supplying a laser beam source with an exposure current level higher than a threshold level of said laser beam source; and
   a second current supply source for supplying a bias current to said laser beam source when a scanning position of said laser beam source is a predetermined distance ahead of an exposure starting position for at least one area to be exposed, said first and second current supply sources being connected in parallel to each other.

6. An apparatus according to claim 5, wherein said second current supply source supplies said bias current to said laser beam source while said scanning position of said laser beam source travels between a position which is a predetermined distance ahead of a first exposure area and a trailing edge of a second exposure area.

7. An apparatus according to claim 6, wherein said second current supply source supplies said bias current to said laser beam source while said scanning position of said laser beam source travels between a predetermined distance ahead of said second exposure area and a trailing edge of a next single exposure area.

8. An apparatus according to claim 5, wherein said second current supply source supplies said bias current to said laser beam source while said scanning position of said laser beam source travels between a first predetermined distance ahead of a subsequent exposure area and a trailing edge of said subsequent exposure area.

* * * * *